(12) United States Patent
Tomikawa et al.

(10) Patent No.: US 6,209,393 B1
(45) Date of Patent: Apr. 3, 2001

(54) VIBRATION GYROSCOPE

(75) Inventors: Yoshiro Tomikawa, Yonezawa; Kouichi Kanayama; Takeshi Koiso, both of Sodegaura, all of (JP)

(73) Assignee: Mitsui Chemicals Inc., Tokyo (JP)

( * ) Notice: Subject to any disclaimer, the term of this patent is extended or adjusted under 35 U.S.C. 154(b) by 0 days.

(21) Appl. No.: 09/091,886

(22) PCT Filed: Oct. 24, 1997

(86) PCT No.: PCT/JP97/03862

§ 371 Date: Aug. 26, 1998

§ 102(e) Date: Aug. 26, 1998

(87) PCT Pub. No.: WO98/19134

PCT Pub. Date: Jul. 5, 1998

(30) Foreign Application Priority Data

Oct. 29, 1996 (JP) .................................................... 8-303758

(51) Int. Cl.⁷ .................................................... G01C 19/00
(52) U.S. Cl. .................................................... 73/504.12
(58) Field of Search ........................... 73/504.12, 504.02; 310/311, 328, 330, 331, 332, 334, 333, 367, 368

(56) References Cited

U.S. PATENT DOCUMENTS

| | | | |
|---|---|---|---|
| 5,635,786 | * 6/1997 | Fujimoto et al. | 310/316 |
| 5,693,998 | * 12/1997 | Fujimoto et al. | 310/366 |
| 5,837,895 | * 11/1998 | Fujimoto | 73/504.12 |
| 6,013,971 | * 1/2000 | Fujimoto | 310/322 |
| 6,023,973 | * 2/2000 | Yabe et al. | 73/504.12 |
| 6,058,777 | * 5/2000 | Fujimoto et al. | 73/504.12 |

FOREIGN PATENT DOCUMENTS

| | | |
|---|---|---|
| 61-247915 | 11/1986 | (JP) . |
| 8-194661 | 4/1996 | (JP) . |
| 8-94363 | 4/1996 | (JP) . |
| 8-128833 | 5/1996 | (JP) . |
| 8-152328 | 6/1996 | (JP) . |
| 8-271263 | 10/1996 | (JP) . |
| 8-278144 | 10/1996 | (JP) . |
| 8-338731 | 12/1996 | (JP) . |
| 9-145381 | 6/1997 | (JP) . |

* cited by examiner

*Primary Examiner*—Richard A. Moller
(74) *Attorney, Agent, or Firm*—Birch, Stewart, Kolasch & Birch, LLP

(57) ABSTRACT

A piezoelectric unit is composed of a plurality of piezoelectric elements. In one embodiment, a first driving electrode is provided over the whole surface of the lower surface of the piezoelectric element. A second driving electrode is provided over the whole surface between the piezoelectric elements. The driving electrodes are connected to a driving signal source. Detection electrodes are provided on the upper surface of the piezoelectric element. At least one of the detection electrodes is connected to one of the output terminals and at least another of the detection electrodes is connected to the other of the output electrodes. One piezoelectric element is polarized upward and another piezoelectric element is polarized downward. A vertical $1^{st}$ order vibration is driven in a longitudinal direction and a $2^{nd}$ order bending vibration is detected by the detection electrodes, and a voltage proportional to a coriolis force (rotational angular velocity) is outputted. With this construction, a vibration gyroscope having a reduced thickness and width can be produced.

18 Claims, 8 Drawing Sheets

VIBRATION GYROSCOPE

This application is the national phase under 35 U.S.C. §371 of prior PCT International Application No. PCT/JP97/03862 which has an International filing date of Oct. 24, 1997 which designated the United States of America, the entire contents of which are hereby incorporated by reference.

1. Technical Field

The present invention relates to a vibratory gyroscope, and more particularly, to a vibratory gyroscope used for navigation and the like of an automobile and the like.

2. Background Art

FIG. 11 is a perspective view showing a structure of a conventional vibratory gyroscope. The above-mentioned vibratory gyroscope has a structure in which a exciting piezoelectric ceramic 3 and a detective piezoelectric ceramic 4 are stuck to a permanent elastic metal tuning fork type vibrator 1 having a square section. A principal axis direction of the permanent elastic metal tuning fork type vibrator 1 is taken as a Z axis, a normal direction of opposed one set of planes is taken as an X axis, and a normal direction of opposed another one set of planes is taken as a Y axis. The vibrator 1 is supported by supporting pins 2a, 2b, 2c and 2d.

The operation of the vibratory gyroscope having such a structure will be explained next. By exciting the vibratory piezoelectric porcelain 3 by electric signal from a driving signal source (not shown), a flexural vibration is generated in the vibrator 1 within the X axis plane. If angular velocity is applied around the Z axis in this state, Coriolis force acts in a direction perpendicular to the X axis plane, and a vibration in the Y axis direction is generated. The vibration in the Y axis direction generated at this time is detected by the detective piezoelectric ceramic 4, and the angular velocity can be measured.

Since the conventional vibratory gyroscope has the structure in which the permanent elastic metal and the piezoelectric ceramic are stuck, there is a problem that the manufacturing cost is increased.

Further, since the conventional vibratory gyroscope has a shape which is longer in the rotation axis (Z axis) direction, when it is mounted in an electronic equipment, it is difficult to meet requirement for reducing the equipment in size and thickness.

Therefore, it is a main object of the present invention to provide a vibratory gyroscope which does not require sticking, and which can reduce the manufacturing cost.

Another object of the present invention is to provide a vibratory gyroscope which can reduce its thickness and width.

DISCLOSURE OF THE INVENTION

As a result of a hard research, the present inventors have found that excellent characteristics are shown by a structure in which an angular velocity is obtained by providing a vibrator made of a piezoelectric substance with exciting electrodes to excite a vibration in a longitudinal direction by the exciting electrodes, and by detecting, by detective electrodes, a flexural vibration in a plane perpendicular to a rotation axis which is induced by Coriolis force generated by angular velocity around the rotation axis which is in a thickness wise direction of the vibrator.

On the contrary, by the same principle, it is also possible to excite the f lexural vibration so that a vibration in a longitudinal direction of the vibrator induced by Coriolis force generated by angular velocity around the rotation axis is detected by the detective electrodes provided on a portion of the vibrator, thereby obtaining the angular velocity.

When an electric signal of a resonance frequency in a longitudinal direction of the vibrator is input to the exciting electrodes, a longitudinal vibration is generated in the vibrator. In this state, if angular velocity around the rotation axis in the thicknesswise direction of the vibrator is applied, Coriolis force is generated in a direction perpendicular to both the rotation axis and the longitudinal vibration direction. By the generated Coriolis force and the longitudinal vibration, a flexural vibration is generated in a plane determined by the direction of the Coriolis force and the direction of the longitudinal vibration. The detective electrodes for detecting only this flexural vibration are provided on the portion of the vibrator, and the angular velocity is measured.

According to the vibratory gyroscope of the above-described structure, an angular velocity sensor can be realized only by forming the exciting electrodes and the detective electrodes on the piezoelectric substance and the like, and it is possible to simplify the structure and to largely reduce the manufacturing cost as compared with the conventional vibratory gyroscope.

Further, since the gyroscope is constructed such that the thicknesswise direction of the vibrator is taken as the rotation axis and the flexural vibration in the plane perpendicular to the rotation axis is detected by the detective electrodes provided on the portion of the vibrator, the shape of the gyroscope is narrow in width and thin in thickness, and it is possible to make the sensor smaller as compared with the conventional vibratory gyroscope of three-dimensional structure.

The present invention is based upon the above-mentioned findings, and according to a first aspect of the present invention, there is provided a vibratory gyroscope, characterized by comprising a vibrator made of a piezoelectric substance;

exciting electrodes which are secured to the vibrator and are capable of exciting the vibrator to cause one of a longitudinal vibration and a flexural vibration; and detective electrodes which are secured to the vibrator and are capable of detecting the other of the longitudinal vibration and the flexural vibration of the vibrator.

Preferably, the longitudinal vibration is a first longitudinal vibration mode, and the flexural vibration is a second flexural vibration mode.

According to a second aspect, there is provided a vibratory gyroscope, characterized by comprising:

a vibrator made of a piezoelectric substance and having a longitudinal direction, a widthwise direction and a thicknesswise direction which are perpendicular to one another;

exciting electrodes which are secured to the vibrator and are capable of exciting the vibrator to cause one of a vibration in the longitudinal direction and a flexural vibration; and detective electrodes which are secured to the vibrator and are capable of detecting the other of the vibration in the longitudinal vibration and the flexural vibration of the vibrator.

Preferably, the vibration in the longitudinal direction is a longitudinal vibration, a rotation axis of the vibrator exists in the thicknesswise direction of the vibrator, and the flexural vibration is a vibration in a predetermined plane perpendicular to the thicknesswise direction.

Still preferably, the longitudinal vibration is a first longitudinal vibration mode, and the flexural vibration is a second flexural vibration mode.

Still preferably, the vibrator includes an exciting portion for exciting the vibrator, and a detective portion for detecting the other of the vibration in the longitudinal direction and the flexural vibration of the vibrator, the exciting electrodes are secured to the exciting portion, the detective electrodes are secured to the detective portion, and the exciting portion and the detective portion are laminated in the thicknesswise direction.

Alternatively, the vibrator includes an exciting portion for exciting the vibrator, and a detective portion for detecting the other of the vibration in the longitudinal direction and the flexural vibration of the vibrator, the exciting electrodes are secured to the exciting portion, the detective electrodes are secured to the detective portion, and the exciting portion and the detective portion are juxtaposed in a direction of a plane including the longitudinal direction and the widthwise direction of the rectangular parallelepiped.

Further, in the above-mentioned second aspect of the present invention, preferably, the exciting electrodes are provided in parallel to a plane which is substantially perpendicular to the thicknesswise direction, the piezoelectric substance between the exciting electrodes is polarized in the thicknesswise direction, the detective electrodes are provided in parallel to a plane which is substantially perpendicular to the thicknesswise direction, and a portion of the piezoelectric substance on which the detective electrodes are provided is polarized in the thicknesswise direction.

Further, in the above-mentioned second aspect of the present invention, preferably, the detective electrodes are provided such as to be opposed to each other in the thicknesswise direction, and the piezoelectric substance between the mutually opposed detective electrodes is polarized in the thicknesswise direction.

Further, in the above-mentioned second aspect of the present invention, preferably, the detective electrodes or the exciting electrodes are provided in parallel to a plane which is substantially perpendicular to the widthwise direction, and the piezoelectric substance between the detective electrodes or between the exciting electrodes is polarized in the longitudinal direction.

Further, in the above-mentioned second aspect of the present invention, preferably, the detective electrodes or the exciting electrodes are provided symmetrically in the widthwise direction.

Further, in the above-mentioned second aspect of the present invention, preferably, a rotation axis of the vibrator exists in the thicknesswise direction of the vibrator, and the detective electrodes are provided symmetrically with respect to a plane which includes the rotation axis and which is substantially perpendicular to the widthwise direction.

According to a third aspect of the present invention, there is provided a vibratory gyroscope, characterized by comprising:

a vibrator made of a piezoelectric substance and having a longitudinal direction, a widthwise direction and a thicknesswise direction which are perpendicular to one another;

exciting electrodes secured to the vibrator; and detective electrodes secured to the vibrator; wherein the exciting electrodes are provided in parallel to a plane which is substantially perpendicular to the thicknesswise direction, the piezoelectric substance between the exciting electrodes is polarized in the thicknesswise direction, a rotation axis of the vibrator exists in the thicknesswise direction of the vibrator, and the detective electrodes are provided symmetrically with respect to a plane which includes the rotation axis and which is in parallel to the longitudinal direction.

According to a fourth aspect of the present invention, there is provided a vibratory gyroscope, characterized by comprising:

a vibrator made of a piezoelectric substance having a laminated structure in which a plurality of piezoelectric substance layers are laminated in a thicknesswise direction, polarization direction of the plurality of piezoelectric substance layers being in parallel to the thicknesswise direction, one group of exciting electrodes and detective electrodes, which are constituted to sandwich, in the thicknesswise direction, the piezoelectric substance layer or layers constituting a first laminated portion among the plurality of piezoelectric substance layers; and the other group of the exciting electrodes and the detective electrodes, which are provided on a main face or main faces of the piezoelectric substance layer or layers constituting a second laminated portion among the plurality of piezoelectric substance layers, the main face or main faces being substantially perpendicular to the thicknesswise direction, and the other group of the exciting electrodes and the detective electrodes being exciting electrodes or detective electrodes of a flexural vibration which are disposed to be separated in a vibration direction of the flexural vibration.

According to a fifth aspect of the present invention, there is provided a vibratory gyroscope, characterized by comprising a vibrator made of a plate-like piezoelectric substance, wherein one group of exciting electrodes and detective electrodes which excite or detect a vibration in a longitudinal direction and which have a size of about one-third to two-thirds of a longitudinal size of the vibrator are provided, such as to be opposed to each other, on both main faces substantially perpendicular to a thicknesswise direction of the vibrator, and the other group of the exciting electrodes and the detective electrodes separated in a vibration direction of a flexural vibration are provided in another portion of the vibrator in its longitudinal direction, the other group of the exciting electrodes and the detective electrodes being exciting electrodes or detective electrodes of the flexural vibration.

According to a sixth aspect of the present invention, there is provided a vibratory gyroscope, characterized by comprising a vibrator made of a plate-like piezoelectric substance, wherein one group of exciting electrodes and detective electrodes extending in a longitudinal direction of the vibrator are provided on central portions of main faces in a widthwise direction of the vibrator, the main faces being substantially perpendicular to a thicknesswise direction of the vibrator, and the other group of the exciting electrodes and the detective electrodes are provided on both sides of the vibrator in the widthwise direction, the other group of the exciting electrodes and the detective electrodes being exciting electrodes or detective electrodes of the flexural vibration.

Preferably, a polarization direction of the vibrator made of the piezoelectric substance is in parallel to a thicknesswise direction of the vibrator.

According to a seventh aspect of the present invention, there is provided a vibratory gyroscope, characterized by comprising a vibrator made of a plate-like piezoelectric substance, wherein one group of exciting electrodes and detective electrodes are provided, such as to be opposed to each other, on one side of both first main faces in a longitudinal direction of the vibrator, the both first main faces being substantially perpendicular to a thicknesswise direction of the vibrator, a polarization direction of a portion of the piezoelectric substance which is sandwiched by the one group of the exciting electrodes and the detective electrodes is set to be the thicknesswise direction, the other group of the exciting electrodes and the detective electrodes are provided, such as to be opposed to each other, on both second main faces of a portion of the vibrator in which the exciting electrodes are not provided, the second faces being substantially perpendicular to a widthwise direction of the vibrator and the other group of the exciting electrodes and the detective electrodes being exciting electrodes or detective electrodes of a flexural vibration, and a polarization direction of the piezoelectric substance between the other group of the exciting electrodes and the detective electrodes of the flexural vibration is set to be in parallel to the longitudinal direction.

According to a eighth aspect of the present invention, there is provided a vibratory gyroscope, characterized by comprising:

a vibrator;

exciting means capable of exciting the vibrator to cause one of a longitudinal vibration and a flexural vibration; and detective means capable of detecting the other of the longitudinal vibration and the flexural vibration of the vibrator.

According to a ninth aspect of the present invention, there is provided a vibratory gyroscope, characterized by comprising:

a plate-like vibrator;

exciting means capable of exciting the vibrator to cause one of a vibration in a longitudinal vibration and a flexural vibration of the vibrator; and detective means capable of detecting the other of the vibration in the longitudinal direction and the flexural vibration of the vibrator.

Preferably, the vibration in the longitudinal direction is a longitudinal vibration, a rotation axis of the vibrator exists in a thicknesswise direction of the vibrator, and the flexural vibration is a vibration in a predetermined plane perpendicular to the thicknesswise direction.

Still preferably, the longitudinal vibration is a first longitudinal vibration mode, and the flexural vibration is a second flexural vibration mode.

BRIEF DESCRIPTION OF THE DRAWINGS

FIGS. 1A to 1C are diagrams for explaining a vibratory gyroscope according to a first embodiment of the present invention, wherein FIG. 1A is a perspective view and FIG. 1B and FIG. 1C are schematic plan views;

FIGS. 8A to 8C are views for explaining a vibratory gyroscope according to a seventh embodiment of the present invention, wherein FIG. 8A is a perspective view of the vibratory gyroscope as viewing from above, FIG. 8B is a perspective view of the vibratory gyroscope as viewing from below, and FIG. 8C is a side view of the vibratory gyroscope as viewing from direction of X8—X8;

FIGS. 9A and 9B are views for explaining a vibratory gyroscope according to a eighth embodiment of the present invention, wherein FIG. 9A is a perspective view of the vibratory gyroscope as viewing from above, and FIG. 9B is a perspective view of the vibratory gyroscope as viewing from below;

FIGS. 10A to 10C are views for explaining a vibratory gyroscope according to a ninth embodiment of the present invention, wherein FIG. 10A is a perspective view of the vibratory gyroscope as viewing from above, FIG. 10B is a perspective view of the vibratory gyroscope as viewing from below, and FIG. 10C is a side view of the vibratory gyroscope as viewing from direction of X10—X10.

EMBODIMENTS

Next, embodiments of the present invention will be explained with reference to the drawings.

First Embodiment

Figure 1A:
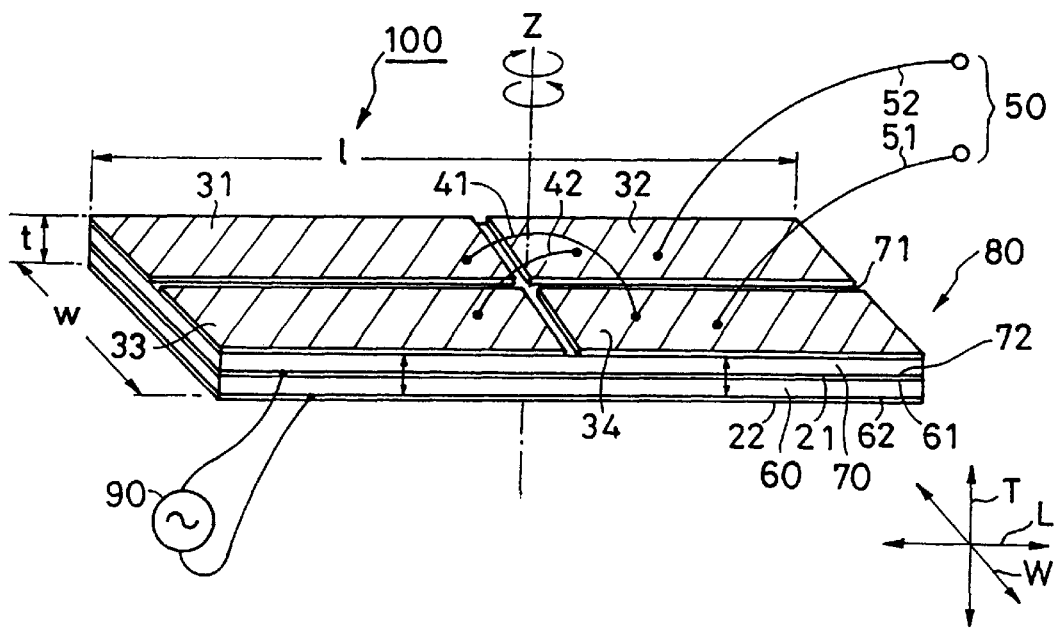
Figure 1B:
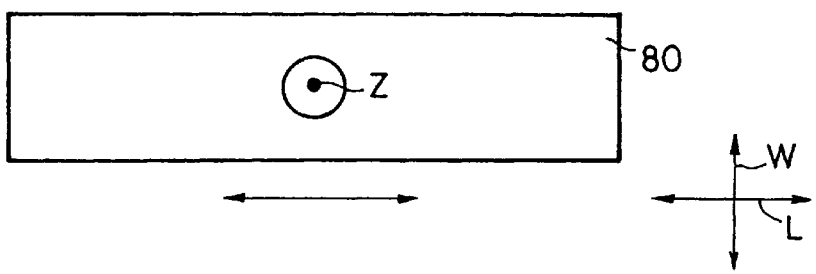
Figure 1C:
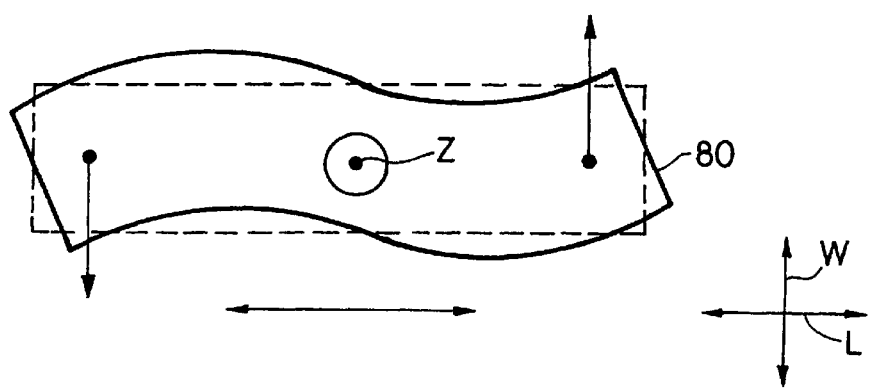

Referring to FIGS. 1A to 1C, a vibratory gyroscope 100 of a first embodiment includes a rectangular parallelepiped piezoelectric substance 80. The piezoelectric substance 80 is formed by laminating two piezoelectric substances 60 and 70 in a thicknesswise direction T.

An exciting electrode 22 is provided on the entire surface of a lower surface 62 of the lower piezoelectric substance 60. A grounding side exciting electrode 21 is provided on the entire surface of an upper surface 61 of the piezoelectric substance 60 and the entire surface of a lower surface 72 of the upper piezoelectric substance 70. The exciting electrodes 21 and 22 are connected to a driving signal source 90.

Detective electrodes 31 to 34 are provided on the upper surface 71 of the piezoelectric substance 70. The detective electrodes 31 to 34 are provided such as to substantially divide the upper surface 71 of the piezoelectric substance 70 into four. The detective electrodes 31 and 33 are provided symmetrically with respect to a plane which includes a rotation axis Z and which is in parallel to a longitudinal direction L and is perpendicular to a widthwise direction W. The detective electrodes 32 and 34 are provided symmetrically with respect to a plane which includes the rotation axis Z and which is in parallel to the longitudinal direction L and is perpendicular to the widthwise direction W. The detective electrodes 31 and 34 are connected through a lead wire 41, and the detective electrodes 32 and 33 are connected through a lead wire 42. The detective electrode 32 is connected to one of output terminals 50 through an output lead wire 52, and the detective electrode 34 is connected to the other output terminal 50 through an output lead wire 51.

The piezoelectric substance 80 is formed by integral sintering using piezoelectric ceramics. A polarization direction of the upper piezoelectric substance 70 is upward direction of the thicknesswise direction T, and a polarization direction of the lower piezoelectric substance 60 is downward direction of the thicknesswise direction T.

The rotation axis Z is provided at the central portion of the gyroscope 100 in the longitudinal direction L and at the central portion thereof in widthwise direction W as viewed on a plane of the gyroscope 100. The piezoelectric gyroscope 100 is supported by securing the central portion thereof using silicone rubber adhesive.

The operation of this piezoelectric gyroscope 100 will be explained next. In order to operate the piezoelectric gyroscope 100, a driving signal is first applied to the exciting electrodes 21 and 22 from the driving signal source 90 to excite the piezoelectric substance 60, thereby exciting the piezoelectric substance 70 which is integrally formed with the piezoelectric substance 60. In the present embodiment, a first longitudinal vibration is excited in the longitudinal direction L. When the piezoelectric gyroscope 100 remains at rest, as shown in FIG. 1B, electric charges appearing in the detective electrodes 31 to 34 are in the same electric potential since they are in-phase with one another and as a result, an output appearing in the output terminal 50 becomes zero.

When the piezoelectric gyroscope 100 is rotating around the rotation axis Z, as shown in FIG. 1C, Coriolis force acts in a direction perpendicular to the longitudinal vibration (widthwise direction W in the present embodiment) and perpendicular to the rotation axis Z, and flexural vibration, especially second flexural vibration is generated. For example, as shown in FIG. 1C, at a particular instant, portions of the gyroscope on which the detective electrodes 31 and 34 are provided are extended, and portions of the gyroscope on which the detective electrodes 32 and 33 are provided are shrunk. As a result, polarity of electric charges appearing in the detective electrodes 31 and 34 and polarity of electric charges appearing in the detective electrodes 32 and 33 become opposite, and voltage which is in proportional to Coriolis force (angular velocity) is output from the output terminal 50.

When the piezoelectric substance is excited by the first longitudinal vibration and the second flexural vibration mode is detected in this manner, since the coupling between the first longitudinal vibration mode and the second flexural vibration mode is great, large output can be produced. Further, in order to increase the coupling between the first longitudinal vibration mode and the second flexural vibration mode, it is especially preferable to bring the relation between the width w and the length l of the piezoelectric substance 80 into (w/l) ≈0.28. This fact can also be applied to a piezoelectric substance 10 used in second to ninth embodiments which will be described later.

Figure 2:
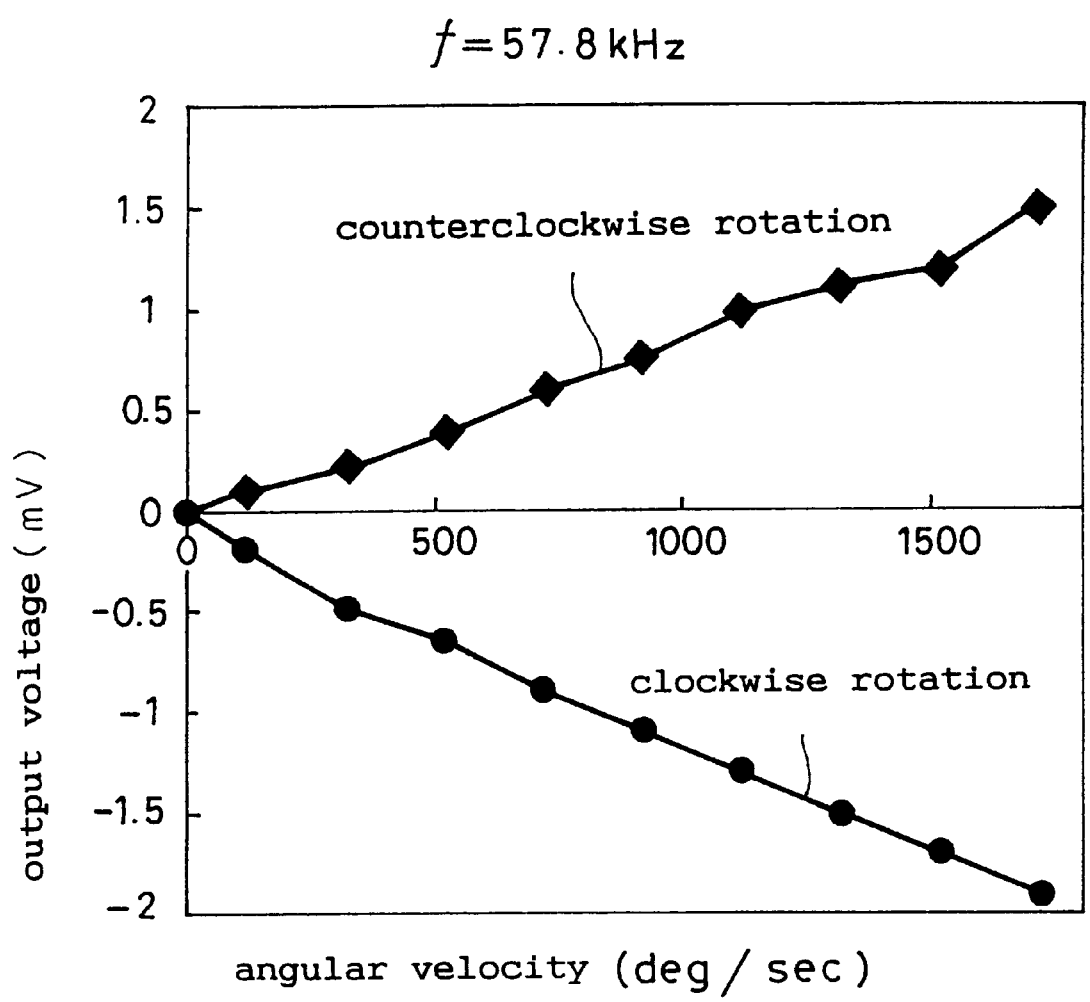
FIG. 2 is a plot showing the relation between an angular velocity and an output voltage of the vibratory gyroscope according to the first embodiment of the present invention.

Next, a prototype of the vibratory gyroscope 100 was prepared and its characteristics were measured. The prototype of the vibratory gyroscope 100 had a length l of 29 mm, a width w of 7.5 mm, and a thickness t of 1.4 mm. The electrode was formed by sintering Ag—Pd. FIG. 2 shows the relation between the angular velocity and the output voltage of the prototype of the vibratory gyroscope 100 prepared in this manner. It can be found that the output voltage which is substantially proportional to the angular velocity can be obtained.

Second Embodiment

Figure 3:
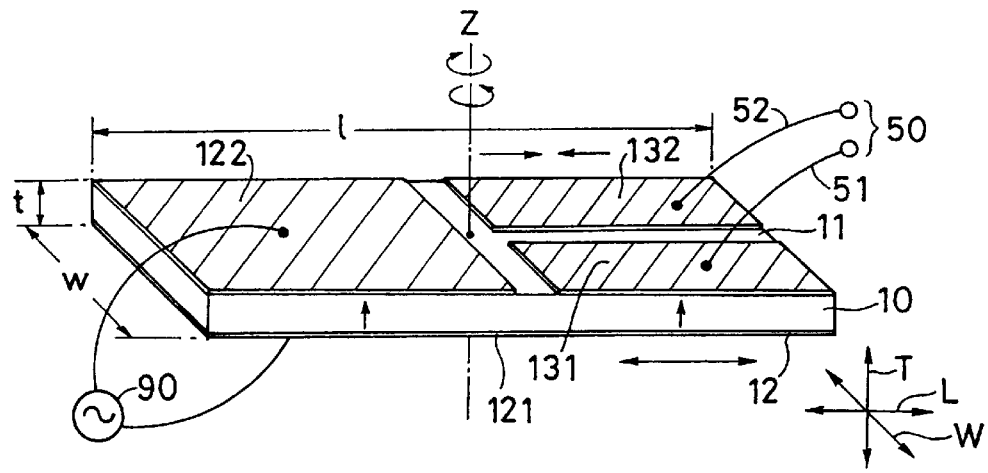
FIG. 3 is a perspective view for explaining a vibratory gyroscope according to a second embodiment of the present invention.

Referring to FIG. 3, a vibratory gyroscope 100 of a second embodiment includes a rectangular parallelepiped piezoelectric substance 10. A grounding side exciting electrode 121 is provided on the entire surface of a lower surface 12 of the piezoelectric substance 10. An exciting electrode 122 is provided on a substantially left half region of an upper surface 11 of the piezoelectric substance 10. The exciting electrodes 121 and 122 are connected to a driving signal source 90.

Detective electrodes 131 and 132 are provided on a substantially right half region of the upper surface 11 of the piezoelectric substance 10. The detective electrodes 131 and 132 are provided such as to divide the substantially right half region of the piezoelectric substance 10 into two in the widthwise direction W. The detective electrodes 131 and 132 are provided symmetrically with respect to a plane which includes the rotation axis Z and which is in parallel to the longitudinal direction L and is perpendicular to the widthwise direction W. The detective electrode 131 is connected to one of output terminals 50 through an output lead wire 51, and the detective electrode 132 is connected to the other output terminal 50 through an output lead wire 52.

The piezoelectric substance 10 is formed of piezoelectric ceramics. A polarization direction of the piezoelectric substance 10 is upward direction of the thicknesswise direction T. The prototype of the vibratory gyroscope 100 had a length l of 29 mm, a width w of 7.5 mm, and a thickness t of 1.4 mm. The electrode was formed by sintering Ag—Pd. The rotation axis Z is provided at the central portion of the gyroscope 100 in the longitudinal direction L and at the central portion thereof in widthwise direction W as viewed on a plane of the gyroscope 100.

When the piezoelectric gyroscope 100 is rotating around the rotation axis Z, Coriolis force acts, and second flexural vibration is generated. For example, at a particular instant, a portion of the gyroscope on which the detective electrode 131 is provided is extended, and a portion of the gyroscope on which the detective electrode 132 is provided is shrunk. As a result, a polarity of electric charge appearing in the detective electrode 131 and a polarity of electric charge appearing in the detective electrodes 132 become opposite, and voltage which is in proportional to Coriolis force (angular velocity) is output from the output terminal 50.

Third Embodiment

Figure 4:
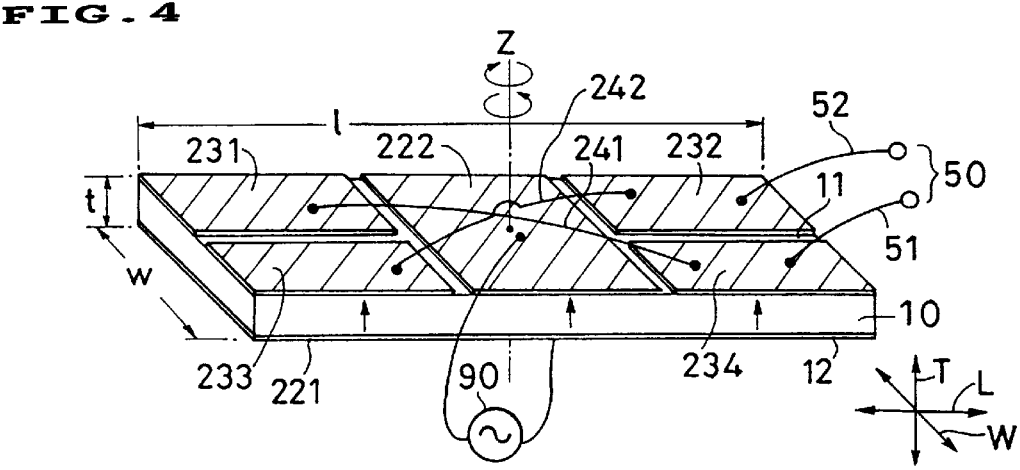
FIG. 4 is a perspective view for explaining a vibratory gyroscope according to a third embodiment of the present invention.

Referring to FIG. 4, a vibratory gyroscope 100 of a third embodiment includes a rectangular parallelepiped piezoelectric substance 10. A grounding side exciting electro de 221 is provided on the entire surface of a lower surface 12 of the piezoelectric substance 10. An exciting electrode 222 having a length of about one-third of the piezoelectric substance 10 in its longitudinal direction L is provided at the central portion of the upper surface 11 of the piezoelectric substance 10 in its longitudinal direction L such as to extend over substantially the entire width of the piezoelectric substance 10 in its widthwise direction W. The exciting electrodes 221 and 222 are connected to a driving signal source 90.

Detective electrodes 231 and 233 are provided on substantially left one-third region of the upper surface 11 of the piezoelectric substance 10 in the longitudinal direction L, and detective electrodes 232 and 234 are provided on substantially right one-third region of the upper surface 11 of the piezoelectric substance 10. The detective electrodes 231 and 233 are provided symmetrically with respect to a plane which includes the rotation axis Z and which is in parallel to the longitudinal direction L and is perpendicular to the widthwise direction W as well as the detective electrodes 232 and 234. The detective electrodes 231 and 234 are connected through a lead wire 241, and the detective electrodes 232 and 233 are connected through a lead wire 242. The detective electrode 232 is connected to one of output terminals 50 through an output lead wire 52, and the detective electrode 234 is connected to the other output terminal 50 through an output lead wire 51.

The piezoelectric substance 10 is formed of piezoelectric ceramics. A polarization direction of the piezoelectric substance 10 is upward direction of the thicknesswise direction T. The rotation axis Z is provided at the central portion of the gyroscope 100 in the longitudinal direction L and at the central portion thereof in widthwise direction W as viewed on a plane of the gyroscope 100. The operation of the vibratory gyroscope is the same as that of the first embodiment.

Fourth Embodiment

Figure 5:
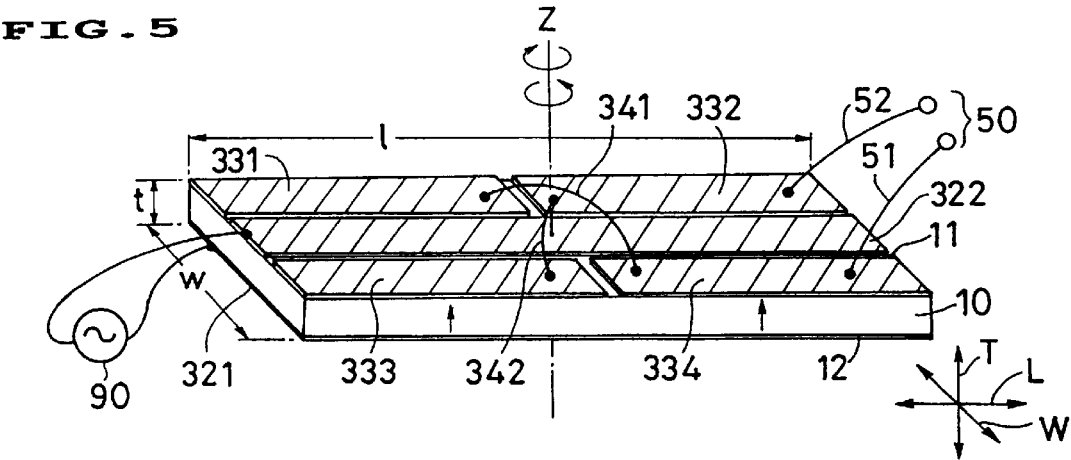
FIG. 5 is a perspective view for explaining a vibratory gyroscope according to a fourth embodiment of the present invention.

Referring to FIG. 5, a vibratory gyroscope 100 of a fourth embodiment includes a rectangular parallelepiped piezoelectric substance 10. A grounding side exciting electrode 321 is provided on the entire surface of a lower surface 12 of the piezoelectric substance 10. An exciting electrode 322 having a length of about one-third of the piezoelectric substance 10 in its longitudinal direction L is provided at the central portion of the upper surface 11 of the piezoelectric substance 10 in its longitudinal direction L such as to extend over substantially the entire width of the piezoelectric substance 10 in its widthwise direction W. The exciting electrodes 321 and 322 are connected to a driving signal source 90.

Detective electrodes 333 and 334 are provided on substantially fore one-third region of the upper surface 11 of the piezoelectric substance 10 in the widthwise direction W, and detective electrodes 331 and 334 are provided on substantially rear one-third region of the upper surface 11 of the piezoelectric substance 10. The detective electrodes 331 and 333 are provided symmetrically with respect to a plane which includes the rotation axis Z and which is in parallel to the longitudinal direction L and is perpendicular to the widthwise direction W as well as the detective electrodes 332 and 334. The detective electrodes 331 and 334 are connected through a lead wire 341, and the detective electrodes 332 and 333 are connected through a lead wire 342. The detective electrode 332 is connected to one of output terminals 50 through an output lead wire 52, and the detective electrode 334 is connected to the other output terminal 50 through an output lead wire 51.

The piezoelectric substance 10 is formed of piezoelectric ceramics. A polarization direction of the piezoelectric substance 10 is upward direction of the thicknesswise direction T. The prototype of the vibratory gyroscope 100 had a length l of 29 mm, a width w of 7.5 mm, and a thickness t of 1.4 mm. The electrode was formed by sintering Ag—Pd. The rotation axis Z is provided at the central portion of the gyroscope 100 in the longitudinal direction L and at the central portion thereof in widthwise direction W as viewed on a plane of the gyroscope 100. The operation of the vibratory gyroscope is the same as that of the first embodiment.

Fifth Embodiment

Figure 6:
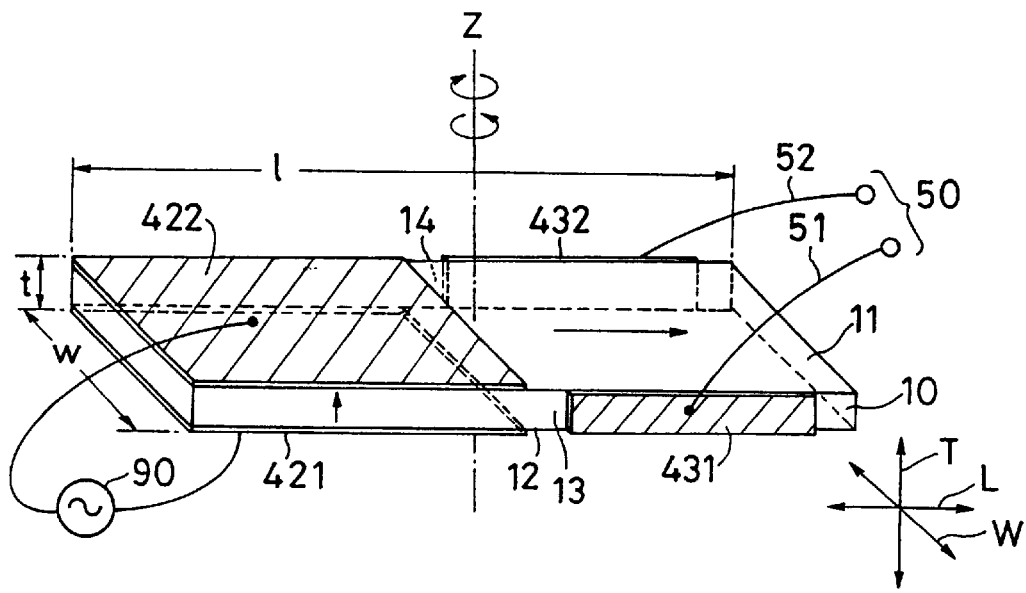
FIG. 6 is a perspective view for explaining a vibratory gyroscope according to a fifth embodiment of the present invention.

Referring to FIG. 6, a vibratory gyroscope 100 of a fifth embodiment includes a rectangular parallelepiped piezoelectric substance 10. A grounding side exciting electrode 421 is provided on a substantially left half region of a lower surface 12 of the piezoelectric substance 10. An exciting electrode 422 is provided on a substantially left half region of an upper surface 11 of the piezoelectric substance 10. A polarization direction of the piezoelectric substance 10 between exciting electrodes 421 and 422 is upward direction of the thicknesswise direction T. The exciting electrodes 421 and 422 are connected to a driving signal source 90.

Detective electrodes 431 and 432 are respectively provided on those side surfaces 13 and 14 which are perpendicular to the widthwise direction W of substantially right half region of the upper surface 11 of the piezoelectric substance 10. The detective electrodes 431 and 432 are provided symmetrically with respect to a plane which includes the rotation axis Z and which is in parallel to the longitudinal direction L and is perpendicular to the widthwise direction W. The piezpelectric substance 10 between the detective electrodes 431 and 432 is polarized in a right direction of the longitudinal direction L. The detective electrode 431 is connected to one of output terminals 50 through an output lead wire 51, and the detective electrode 432 is connected to the other output terminal 50 through an output lead wire 52.

The piezoelectric substance 10 is formed of piezoelectric ceramics. The rotation axis Z is provided at the central portion of the longitudinal direction L and at the central portion of the widthwise direction W of the piezoelectric gyroscope 100 as viewed on a plane thereof.

When the piezoelectric gyroscope 100 is rotating around the rotation axis Z, Coriolis force acts, and second flexural vibration is generated. For example, at a particular instant, a portion of the gyroscope on which the detective electrode 431 is provided is extended, and a portion of the gyroscope on which the detective electrode 432 is provided is shrunk. As a result, a polarity of electric charge appearing in the detective electrode 431 and a polarity of electric charge appearing in the detective electrode 432 become opposite, and voltage which is in proportional to Coriolis force (angular velocity) is output from the output terminal 50.

Sixth Embodiment

Figure 7:
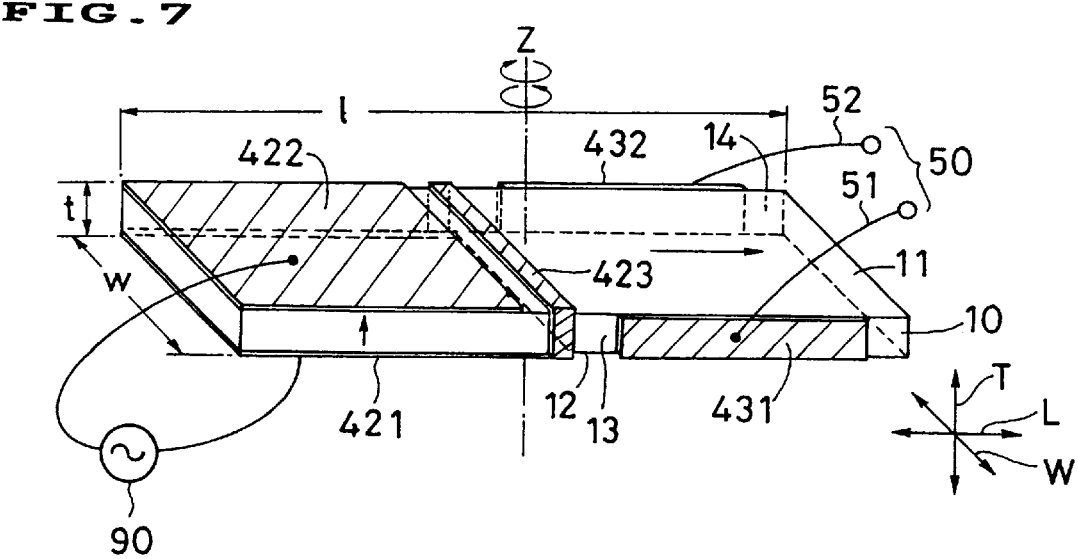
FIG. 7 is a perspective view for explaining a vibratory gyroscope according to a sixth embodiment of the present invention.

Referring to FIG. 7, a vibratory gyroscope 100 of a sixth embodiment has substantially the same structure and is operated substantially in the same manner as that of the above described fifth embodiment. In the vibratory gyroscope 100 of the present embodiment, however, in order to prevent a driving signal from leaking from exciting electrodes 421 and 422 through floating capacity into the detective electrodes 431 and 432, a guard electrode 423 having the same electric potential as the grounding side exciting electrode 421 is provided in a band-like manner between the exciting electrodes 421, 422 and the exciting electrodes 431, 432.

Seventh Embodiment

Figure 8A:
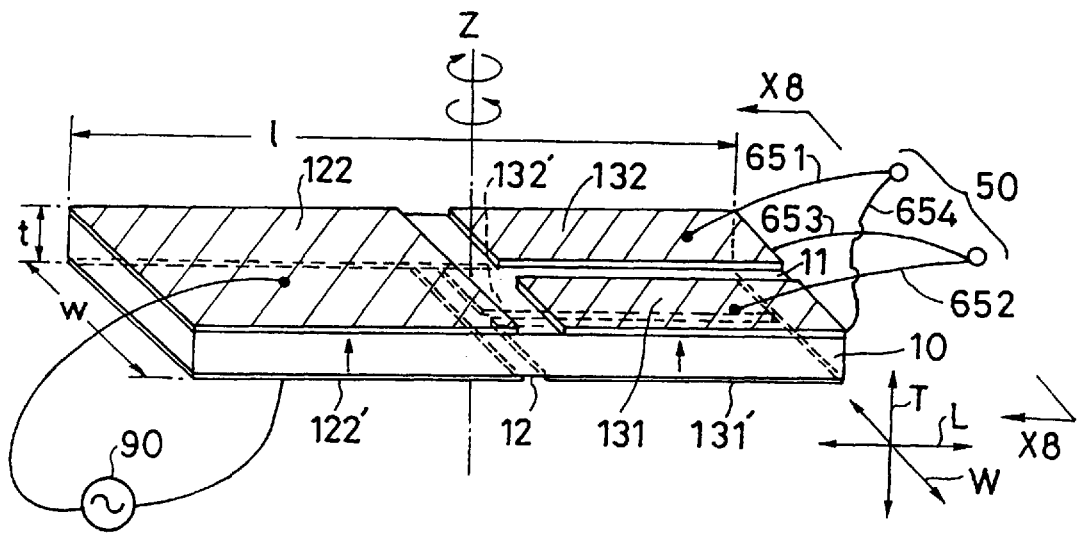
Figure 8B:
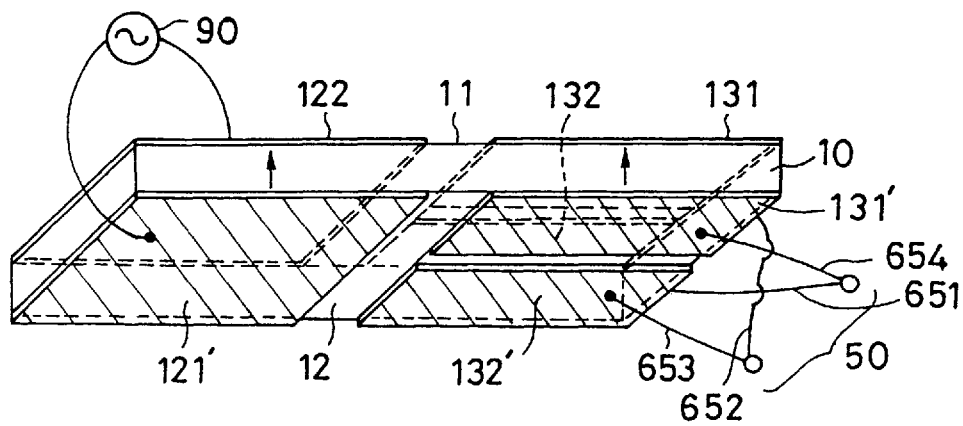
Figure 8C:
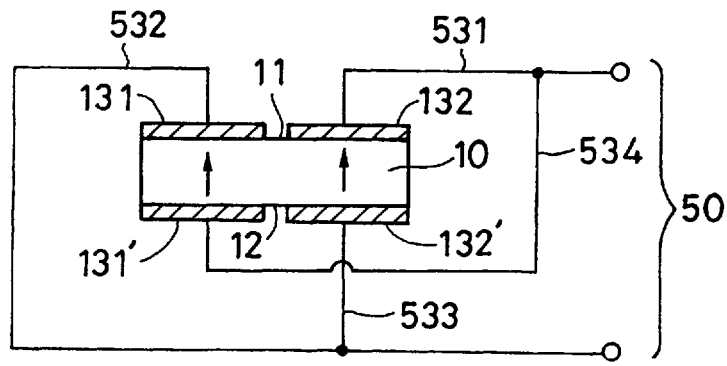

Referring to FIGS. 8A to 8C, a vibratory gyroscope 100 of a seventh embodiment includes a rectangular parallelepiped piezoelectric substance 10. A polarization direction of the piezoelectric substance 10 is upward direction of the thicknesswise direction T.

Although the grounding side exciting electrode 121 is formed on the entire surface of the lower surface 12 of the piezoelectric substance 10 in the vibratory gyroscope 100 of the above-described second embodiment, in a vibratory gyroscope 100 of a seventh embodiment, both the upper surface 11 and the lower surface 12 of the piezoelectric substance 10 have the same electrode patterns as the upper surface 11 of the vibratory gyroscope 100 of the second embodiment. With this structure, an amount of obtainable electric charge is increased as compared with the vibratory gyroscope 100 of the second embodiment, and it is superior in power gain, and S/N ratio is enhanced.

Eighth Embodiment

Figure 9A:
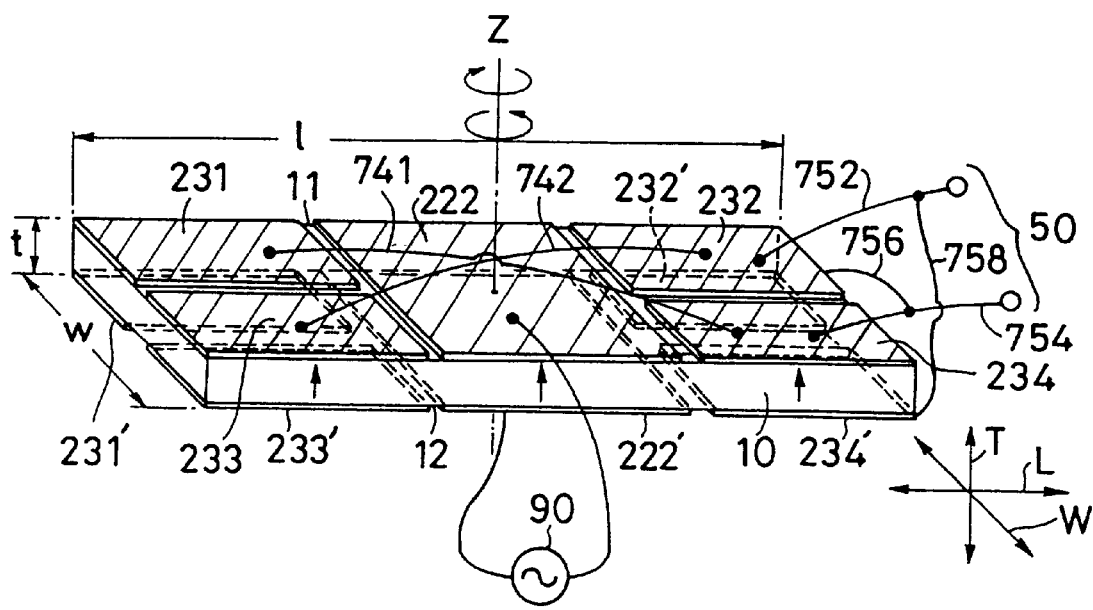
Figure 9B:
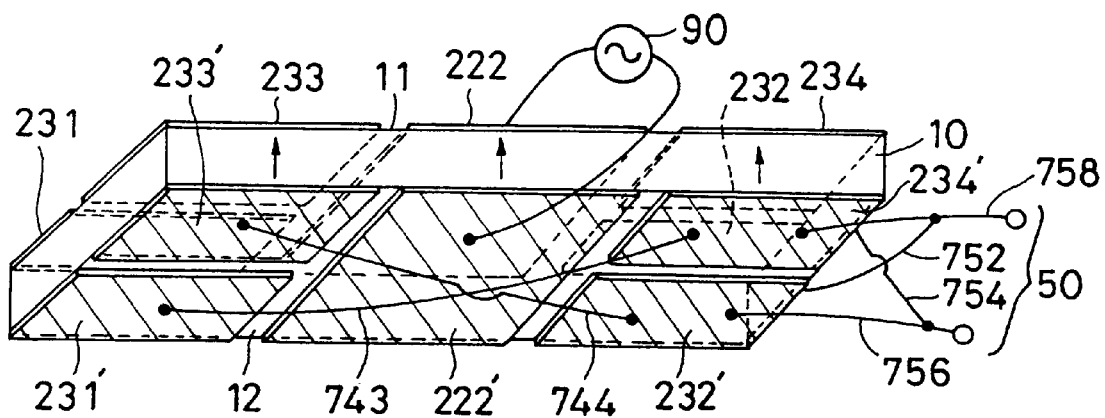

Referring to FIGS. 9A and 9B, a vibratory gyroscope 100 of an eighth embodiment includes a rectangular parallelepiped piezoelectric substance 10. A polarization direction of the piezoelectric substance 10 is upward direction of the thicknesswise direction T.

Although the grounding side exciting electrode 221 is formed on the entire surface of the lower surface 12 of the piezoelectric substance 10 in the vibratory gyroscope 100 of the above-described third embodiment, in a vibratory gyroscope 100 of an eighth embodiment, both the upper surface 11 and the lower surface 12 of the piezoelectric substance 10 have the same electrode patterns as the upper surface 11 of the vibratory gyroscope 100 of the third embodiment. With this structure, an amount of obtainable electric charge is increased as compared with the vibratory gyroscope 100 of the third embodiment, and it is superior in power gain, and S/N ratio is enhanced.

Ninth Embodiment

Figure 10A:
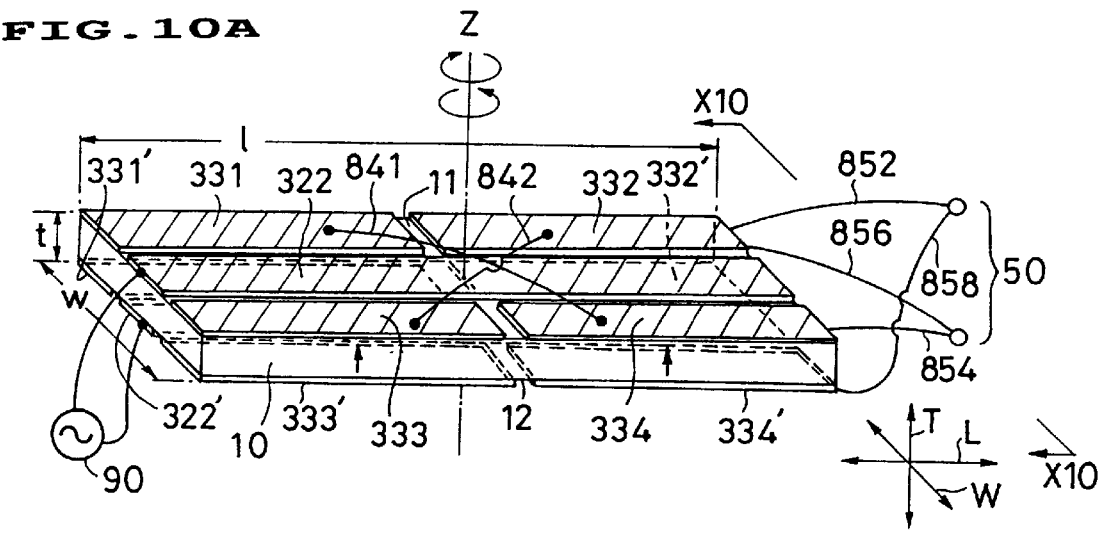
Figure 10B:
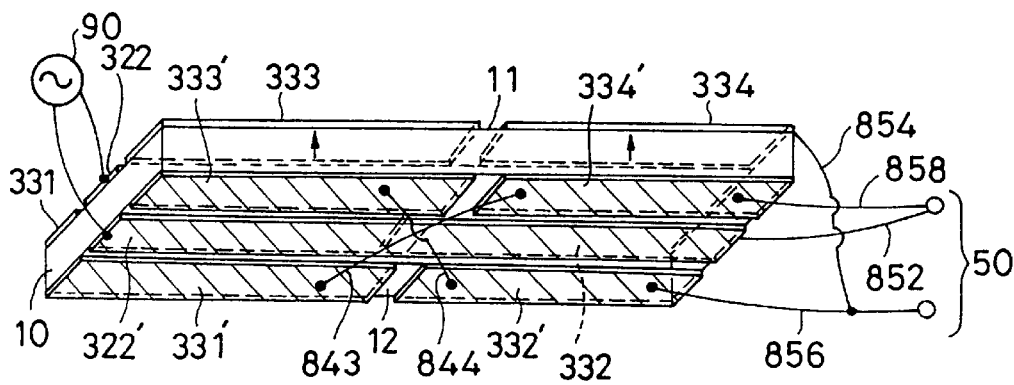
Figure 10C:
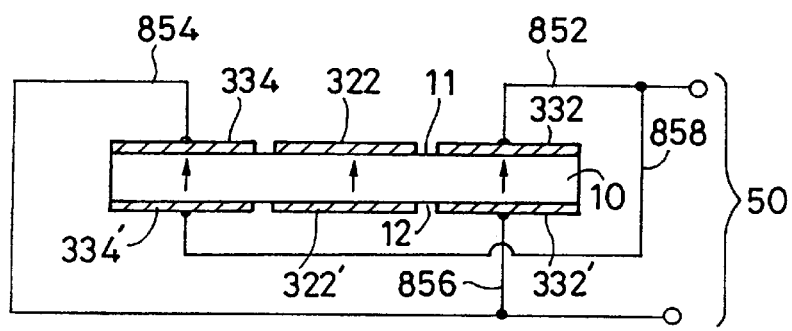
Figure 11:
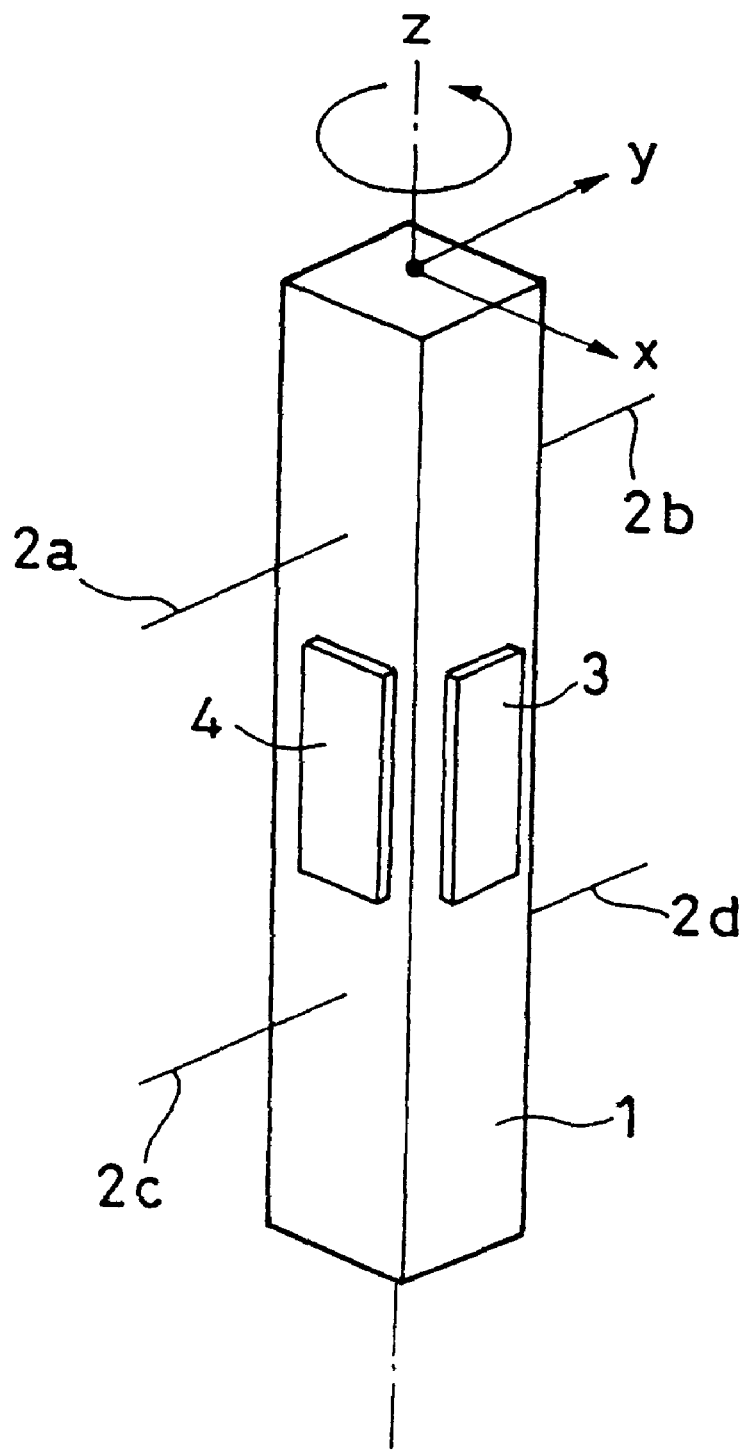
FIG. 11 is a perspective view for explaining a conventional vibratory gyroscope.

Referring to FIGS. 10A to 10C, a Vibratory gyroscope 100 of a ninth embodiment includes a rectangular parallelepiped piezoelectric substance 10. A polarization direction of the piezoelectric substance 10 is upward direction of the thicknesswise direction T.

Although the grounding side exciting electrode 321 is formed on the entire surface of the lower surface 12 of the piezoelectric substance 10 in the vibratory gyroscope 100 of the above-described fourth embodiment, in a vibratory gyroscope 100 of a ninth embodiment, both the upper surface 11 and the lower surface 12 of the piezoelectric substance 10 have the same electrode patterns as the upper surface 11 of the vibratory gyroscope 100 of the fourth embodiment. With this structure, an amount of obtainable electric charge is increased as compared with the vibratory gyroscope 100 of the fourth embodiment, and it is superior in power gain, and S/N ratio is enhanced.

Although there is described a case in which the longitudinal vibration is excited and the flexural vibration is detected in each of the above-described embodiments, the vibratory gyroscope of the same structure can also be used for a case in which the flexural vibration is excited and the longitudinal vibration is detected. In this case, the operation principle is also the same.

Although piezoelectric ceramics was used as the piezoelectric substances 10, 60 and 70 in each of the above-described embodiments, material is not limited to the piezoelectric ceramics, and single crystal such as $LiNbO_3$, $LiTaO_3$, quartz and the like can also be used. It is also possible to make single crystal have a single domain when the crystal grows, and for example, like the piezoelectric substances 60 and 70 of the first embodiment, and like the piezoelectric substance 10 of the second, third, fourth, seventh, eighth and ninth embodiments, if the polarization direction in the piezoelectric substance is the same, the single crystal may be cut out and the electrodes may be provided. In this case, unlike the case of piezoelectric ceramics, polarization processing after the electrode is formed is unnecessary. Further, the polarization direction of the single crystal piezoelectric substance in this case is not strictly limited only if the longitudinal vibration and the flexural vibration can be excited and detected, and it need not be limited to polarization in the thicknesswise direction.

Further, Ag, Ag—Pd-based or Pt-based sintered electrode is preferable used for the exciting electrode, the detective electrode and the guard electrode. These electrodes may also be formed by depositing or sputtering Au or Al.

INDUSTRIAL APPLICABILITY

As described above, according to the present invention, an angular velocity sensor can be realized only by forming electrodes on a piezoelectric substance and the like, and comparing with conventional vibratory gyroscopes, the structure is simple, and the manufacturing cost can largely be reduced.

Further, since the gyroscope can be narrow in width and thin in thickness, the sensor can be reduced in size as comparing with the conventional vibratory gyroscope of a three-dimensional structure.

As a result, the present invention can preferably be utilized for a vibratory gyroscope, especially for a vibratory gyroscope used for navigation and the like of an automobile and the like.

What is claimed is:

1. A vibratory gyroscope, comprising:
   a vibrator made of a piezoelectric substance;
   exciting electrodes which are secured to said vibrator and are capable of exciting said vibrator to cause one of a longitudinal vibration and a flexural vibration; and
   detective electrodes which are secured to said vibrator and are capable of detecting the other of said longitudinal vibration and said flexural vibration of said vibrator.

2. The vibratory gyroscope as recited in claim 1, wherein said longitudinal vibration is a first longitudinal vibration mode, and said flexural vibration is a second flexural vibration mode.

3. A vibratory gyroscope, comprising:
   a vibrator made of a piezoelectric substance and having a longitudinal direction, a widthwise direction and a thicknesswise direction which are perpendicular to one another;
   exciting electrodes which are secured to said vibrator and are capable of exciting said vibrator to cause one of a vibration in said longitudinal direction and a flexural vibration; and
   detective electrodes which are secured to said vibrator and are capable of detecting the other of said vibration in said longitudinal direction and said flexural vibration of said vibrator.

4. The vibratory gyroscope as recited in claim 3, wherein said vibration in said longitudinal direction is a longitudinal vibration, a rotation axis of said vibrator exists in said thicknesswise direction of said vibrator, and said flexural vibration is a vibration in a predetermined plane perpendicular to said thicknesswise direction.

5. The vibratory gyroscope as recited in claim 4, wherein said longitudinal vibration is a first longitudinal vibration mode, and said flexural vibration is a second flexural vibration mode.

6. The vibratory gyroscope as recited in claim 5, wherein said vibrator includes an exciting portion for exciting said vibrator, and a detective portion for detecting said other of said vibration in said longitudinal direction and said flexural vibration of said vibrator, said exciting electrodes are secured to said exciting portion, said detective electrodes are secured to said detective portion, and said exciting portion and said detective portion are laminated in said thicknesswise direction.

7. The vibratory gyroscope as recited in claim 5, wherein said vibrator includes an exciting portion for exciting said vibrator, and a detective portion for detecting said other of said vibration in said longitudinal direction and said flexural vibration of said vibrator, said exciting electrodes are secured to said exciting portion, said detective electrodes are secured to said detective portion, and said exciting portion and said detective portion are juxtaposed in a direction of a plane including said longitudinal direction and said widthwise direction of said rectangular parallelepiped.

8. The vibratory gyroscope as recited in claim 3, wherein said exciting electrodes are provided in parallel to a plane which is substantially perpendicular to said thicknesswise direction, said piezoelectric substance between said exciting electrodes is polarized in said thicknesswise direction, said detective electrodes are provided in parallel to a plane which is substantially perpendicular to said thicknesswise direction, and a portion of said piezoelectric substance on which said detective electrodes are provided is polarized in said thicknesswise direction.

9. The vibratory gyroscope as recited in claim 3, wherein said detective electrodes are provided such as to be opposed to each other in said thicknesswise direction, and said piezoelectric substance between said mutually opposed detective electrodes is polarized in said thicknesswise direction.

10. The vibratory gyroscope as recited in claim 3, wherein said detective electrodes or said exciting electrodes are provided in parallel to a plane which is substantially perpendicular to said widthwise direction, and said piezoelectric substance between said detective electrodes or between said exciting electrodes is polarized in said longitudinal direction.

11. The vibratory gyroscope as recited in claim 3, wherein said detective electrodes or said exciting electrodes are provided symmetrically in said widthwise direction.

12. The vibratory gyroscope as recited in claim 3, wherein a rotation axis of said vibrator exists in said thicknesswise direction of said vibrator, and said detective electrodes are provided symmetrically with respect to a plane which includes said rotation axis and which is substantially perpendicular to said widthwise direction.

13. A vibratory gyroscope, comprising:

a vibrator made of a piezoelectric substance and having a longitudinal direction, a widthwise direction and a thicknesswise direction which are perpendicular to one another;

exciting electrodes secured to said vibrator; and detective electrodes secured to said vibrator;

wherein said exciting electrodes are provided in parallel to a plane which is substantially perpendicular to said thicknesswise direction, said piezoelectric substance between said exciting electrodes is polarized in said thicknesswise direction, a rotation axis of said vibrator exists in said thicknesswise direction of said vibrator, and said detective electrodes are provided symmetrically with respect to a plane which includes said rotation axis and which is in parallel to said longitudinal direction.

14. A vibratory gyroscope, comprising:

a vibrator made of a piezoelectric substance having a laminated structure in which a plurality of piezoelectric substance layers are laminated in a thicknesswise direction, a polarization direction of said plurality of piezoelectric substance layers being in parallel to said thicknesswise direction;

a first group of exciting electrodes; and a second group of detective electrodes, wherein one of said first group of exciting electrodes and said second group of detective electrodes is constituted to sandwich, in said thicknesswise direction, one or more of said plurality of piezoelectric substance layers, and the other of said first group of exciting electrodes and said second group of detective electrodes is provided on a main face or main faces of another or other of said plurality of piezoelectric substance layers, said main face or main faces being substantially perpendicular to said thicknesswise direction, and the other of said first group of exciting electrodes and said second group of detective electrodes being exciting electrodes or detective electrodes of a flexural vibration which are disposed to be separated in a vibration direction of said flexural vibration.

15. A vibratory gyroscope, comprising:

a vibrator;

exciting means capable of exciting said vibrator to cause one of a longitudinal vibration and a flexural vibration; and detective means capable of detecting the other of said longitudinal vibration and said flexural vibration of said vibrator.

16. A vibratory gyroscope, comprising:

a plate-shaped vibrator;

exciting means for exciting said vibrator to cause one of a vibration in a longitudinal direction and a flexural vibration of said vibrator; and detective means for detecting the other of said vibration in said longitudinal direction and said flexural vibration.

17. The vibratory gyroscope as recited in claim 16, wherein said vibration in said longitudinal direction is a longitudinal vibration, a rotation axis of said vibrator exists in a thicknesswise direction of said vibrator, and said flexural vibration is a vibration in a predetermined plane perpendicular to said thicknesswise direction.

18. The vibratory gyroscope as recited in claim 17, wherein said longitudinal vibration is a first longitudinal vibration mode, and said flexural vibration is a second flexural vibration mode.

* * * * *